United States Patent
Simon et al.

(10) Patent No.: US 6,930,780 B2
(45) Date of Patent: Aug. 16, 2005

(54) METHOD FOR TAKING A SPATIALLY RESOLVED SPECTRUM BY MEANS OF A FOURIER-TRANSFORM (FT)-SPECTROMETER AND SUCH SPECTROMETER

(75) Inventors: Arno Simon, Karlsruhe (DE); Norbert Rapp, Hagenbach (DE)

(73) Assignee: Bruker Optik GmbH (DE)

( * ) Notice: Subject to any disclaimer, the term of this patent is extended or adjusted under 35 U.S.C. 154(b) by 288 days.

(21) Appl. No.: 10/236,870

(22) Filed: Sep. 6, 2002

(65) Prior Publication Data

US 2003/0067606 A1 Apr. 10, 2003

(30) Foreign Application Priority Data

Sep. 8, 2001 (DE) .......................................... 101 44 214

(51) Int. Cl.[7] ................................................ G01B 9/02
(52) U.S. Cl. ...................................................... 356/451
(58) Field of Search ............................... 356/451, 452, 356/496, 498

(56) References Cited

U.S. PATENT DOCUMENTS

| | | | | |
|---|---|---|---|---|
| 4,538,910 A | * | 9/1985 | Doyle | ........................ 356/451 |
| 4,544,272 A | * | 10/1985 | Doyle | ........................ 356/452 |
| 5,245,406 A | | 9/1993 | Masutani | |
| 5,422,721 A | | 6/1995 | Ryan | |
| 5,539,518 A | * | 7/1996 | Bennett | ....................... 356/452 |
| 5,835,213 A | | 11/1998 | Curbelo | |

FOREIGN PATENT DOCUMENTS

| | | |
|---|---|---|
| DE | 199 40 981 C1 | 7/2001 |
| WO | WO 01/06209 A1 | 1/2001 |

* cited by examiner

*Primary Examiner*—Gregory J. Toatley, Jr.
*Assistant Examiner*—Michael A. Lyons

(57) ABSTRACT

A method for taking a spatially resolved spectrum, in particular an infrared (IR) spectrum, of a sample by means of a Fourier-transform (FT)-spectrometer, is described wherein light emitted by a light source is fed to an interferometer, directed onto the sample and detected by an array-detector, wherein a movable reflector of the interferometer is displaced over a distance s and the array-detector is read out at a number n of predetermined discrete way points $s_1, \ldots, s_n$ of the distance s, respectively. When the movable reflector is displaced over the distance s, the array-detector is first read out at respective non-adjacent way points $s_d$ separated by at least one respective intermediate way point $s_i$, and that the movable reflector is displaced over the distance s at least twice, wherein the array-detector is read out at the way points $s_i$ upon a second or further repeated displacement over the distance s.

9 Claims, 2 Drawing Sheets

METHOD FOR TAKING A SPATIALLY RESOLVED SPECTRUM BY MEANS OF A FOURIER-TRANSFORM (FT)-SPECTROMETER AND SUCH SPECTROMETER

CROSS-REFERENCE TO RELATED APPLICATION

The present application claims priority of German patent application No. 101 44 214 filed on Sep. 8, 2001.

BACKGROUND OF THE INVENTION

The invention relates to a method for taking a spatially resolved spectrum, in particular infrared (IR) spectrum, of a sample by means of a Fourier-transform (FT)-spectrometer, wherein light emitted by a light source is fed to an interferometer, directed onto the sample and detected by an array-detector, wherein a movable reflector of the interferometer is displaced along a distance s and the array-detector is read out at a number of predetermined discrete way points $s_1, \ldots, s_n$ of the distance s.

The invention further relates to a FT-spectrometer, in particular for carrying out the method.

Such a method and a FT-spectrometer are known from their general use.

In FT-spectroscopy, whether spatially resolved or not spatially resolved, the light emitted by the light source is splitted by a semi-permeable beam splitter of the interferometer into two beam parts, which are reflected at a fixed and a movable reflector and brought to interference after recombination. By displacing the movable reflector, the optical path length in one of the interferometer arms is changed which results in a phase difference between both beam parts and, thus, in a change of the interference amplitude. The curve of the intensity of the light as a function of the optical path difference, which is also referred to as interferogram, is detected by the detector. Thus, the distribution of the intensity of the light coming from the sample is first measured in the space domain and subsequently converted into the real spectrum by means of a subsequent Fourier transformation which is carried out by a computer.

The interferogram mentioned before is stored point-by-point rather than being stored continuously. For this purpose, it is usual to simultaneously detect the interference pattern of a monochromatic laser, e.g. a helium-neon laser, the radiation of which is also led in the optical working beam path, for example, by an additional detector diode. The zero passages of the laser sine signal or a multiple of these intervals define the way points, at which the interferogram is stored in digitized manner. For this purpose, the movable reflector of the interferometer is displaced along a predetermined distance, and the respective measuring signal of the sample is read out from the detector at the predetermined discrete way points of the movable reflector.

For taking a spatially resolved spectrum, an array-detector is used, from which all the pixels or voxels have to be read out at each way point, which involves a considerable volume of data entailing the problems described hereinafter when the array-detector is read out at the way points.

For displacing the movable reflector of the interferometer two fundamental technics are known.

In the so-called step-scan-method, the movable reflector is displaced along the distance in discrete steps to the single way points, i.e. the movable reflector is stopped at each of the single predetermined discrete way points, and the array-detector is then read out during the standstill of the reflector at the way points. The disadvantage of this method is that the movable reflector has to be repositioned each time, which entails a downtime during which no data can be picked up by the array-detector. What is more, the exact position of the reflector has to be first waited for, before the data acquisition can begin. The downtimes caused by the positioning of the reflector are in the range of several milliseconds per reflector position, which accordingly sum up according to the usually high number of way points.

In the so-called rapid-scan-method, the movable reflector is continuously displaced, and the array-detector is read out during the displacement of the reflector. However, it has to be taken into consideration that the available array-detectors, for example focal-plane-array-detectors, allow for a data transfer rate in the order of 200 Hz only. This low data rate of available array-detectors requires a very slow rate of displacement of the interferometer reflector in this continuous scan method, which is at 0,1 mm/s (or less) which entails a very sensitive motion of the reflector and, thus, an unprecise pick-up of the spectrum. A rate or speed of displacement of the reflector of about 5 cm/s, as it is usually used by FT-spectrometers for non-spatially resolved spectroscopy, is desirable. However, the low data rate of the array-detectors does not allow for such a high rate of displacement.

It is common to both pick-up technics mentioned before that the measuring signals are picked up sequentially, i.e. all single way points are approached one after another when the movable reflector is displaced along the predetermined distance, and, when doing so, the required image data are picked up sequentially.

It is, therefore, an object of the invention to improve a method of the kind mentioned at the outset such that the disadvantages of the prior art are avoided, in particular that a precise pick-up of the spatially resolved spectrum is rendered possible.

SUMMARY OF THE INVENTION

According to the invention, this object is achieved by a method for taking a spatially resolved spectrum of a sample by means of a Fourier-transform (FT)-spectrometer, comprising the steps of:

feeding light emitted by a light source to an interferometer, said interferometer comprising a movable reflector, displacing said movable reflector along a distance s; directing said light coming from said interferometer onto said sample; detecting said light coming from said sample by an array-detector; and reading out said array-detector at a number n of predetermined discrete way points $s_1, \ldots, s_n$ of said distance s, respectively, wherein said array-detector is first read out at respective non-adjacent way points $s_d$ of said discrete way points $s_1, \ldots, s_n$ which are separated by at least one respective intermediate way point $s_i$, and wherein said movable reflector is displaced over said distance s at least twice, wherein said array-detector is read out at said intermediate way points $s_i$ during a second or further repeated displacement of said reflector along said distance s.

Hence, in the method according to the invention, the array-detector is not read out at each successive way point when the movable reflector is displaced along the predetermined distance, but some way points are leaved out during the data acquisition, at which the array-detector is not read out, and the movable reflector is displaced along the predetermined distance at least a second time, wherein then, when the movable reflector is displaced along the predetermined distance at least a second time, the array-detector is read out at those way points, at which it was not read out when the movable reflector was displaced for the first time. If necessary, the movable reflector is displaced along the predetermined distance more than twice, in order to cover all the way points. The advantage of the method according to the invention is that the movable reflector can be displaced at a high rate of displacement ensuring a little sensitive motion of the reflector, which high rate of displacement would be too high for an array-detector having a low data rate in the common rapid-scan-method. Thus, by virtue of the high rate of displacement of the movable reflector which is rendered possible by the invention, the spatially resolved spectrum can be taken by means of an array-detector with high precision.

In a preferred embodiment, the array-detector is read out at way points $s_1, s_{1+m}, s_{1+2m}, \ldots s_{n-m+1}$ during the first displacement of the reflector along the distance s, at way points $s_2, s_{2+m}, s_{2+2m}, \ldots, s_{n-m+2}$ during the at least second displacement of the reflector along the distance s, and at way points $s_m, s_{2m}, \ldots, s_n$ during the $m^{th}$ displacement along the distance s, wherein 1<m<n and n:m is an integer.

In this embodiment, the array-detector is advantageously read out during each displacement of the reflector along the distance at those way points which are fixedly spaced from one another by an interval determined by the number m, which interval can be advantageously adapted to the data rate of the used array-detector independent from the adjusted rate of displacement of the reflector. In other words, in doing so it is possible to choose the number m just as large as the data rate of the used array-detector requires.

Accordingly, in a further preferred embodiment m is chosen independence on the data rate of the array-detector.

This has the advantage that the time needed for the pick-up of the full spectrum can be minimized in dependence on the data rate of the array-detector. While the number n is determined by the resolution to be achieved or by the maximum wave number range of the spectrum, m is chosen the larger the lower the data rate of the array-detector is, in order to be able to displace the movable reflector at a high as possible rate of displacement of e.g. about 5 cm/s.

In a further preferred embodiment, the array-detector is read out in two directions of displacement of the movable reflector.

This has the advantage that the time needed for the pick-up of the full spectrum can be reduced, because the array-detector is also read out upon the return of the movable reflector.

However, it can be also preferable, if the array-detector is read out in one of the directions of displacement of the movable reflector only, wherein the reflector is returned in an initial position after each displacement along the distance s.

This procedure is somewhat more time-consuming in comparison with the afore-mentioned procedure, because the array-detector is read out during displacement of the movable reflector in one direction only, but this procedure can advantageously enhance the precision of the spatially resolved spectrum, because differences of the position of the reflector at the way points which can possibly arise when the movable reflector is displaced in the one direction and in the other direction do not affect the spectrum.

In the embodiment mentioned last, it is further preferred if the reflector is returned at a rate which is higher than the rate when displaced for reading out the array-detector.

By this measure the time needed for the pick-up of the spectrum can be again reduced when reading out the array-detector in one direction of displacement of the reflector only, by choosing the rate or speed for returning the reflector higher than the rate for displacing the reflector for reading out the array-detector.

In a further preferred embodiment, the reflector is continuously displaced at a constant rate when displaced for reading out the array-detector.

By this measure, downtimes of positioning the movable reflector are avoided in difference to the known step-scan-operation, i.e. the reflector has not to be decelerated and stopped and subsequently accelerated again at the respective way point, where the detector is being read out. In doing so, positioning errors which can affect the precision of the spectrum, are also prevented in an advantageous manner.

In a further preferred embodiment, the reflector is displaced at a rate in the range of about 4 to 6 cm/s, preferably about 5 cm/s.

As already mentioned, the method according to the invention enables such high rates of displacement of the movable reflector which have the advantage that the motion of the reflector is not or only unimportantly sensitive to mechanical influences.

Further, according to the invention a Fourier-Transform (FT)-spectrometer for taking a spatially resolved spectrum of a sample is provided, comprising a light source; an interferometer having a movable reflector which is displaceable along a distance s; an array-detector; and a control operatively connected with said array-detector in order to read out said array-detector at a number n of predetermined discrete way points $s_1, \ldots, s_n$ of said distance s, respectively, said control being configured such that, when said movable reflector is displaced along said distance s, said array-detector is first read out at respective non-adjacent way points $s_d$ separated by at least one respective intermediate way point $s_i$, and said movable reflector is displaced along said distance s at least twice, wherein said array-detector is read out at said intermediate way points $s_i$ during a second or further repeated displacement along said distance s.

Further advantages and features will become apparent from the following description and the attached drawings.

It is to be understood that the above-mentioned features and those to be explained below are not only applicable in the given combinations, but may also be employed in other combinations or taken alone without departing from the scope of the present invention.

BRIEF DESCRIPTION OF THE DRAWINGS

An embodiment of the invention is illustrated in the drawings and will be described hereinafter with reference to the drawings. In the drawings.

DETAILED DESCRIPTION OF A PREFERRED EMBODIMENT

Figure 1:
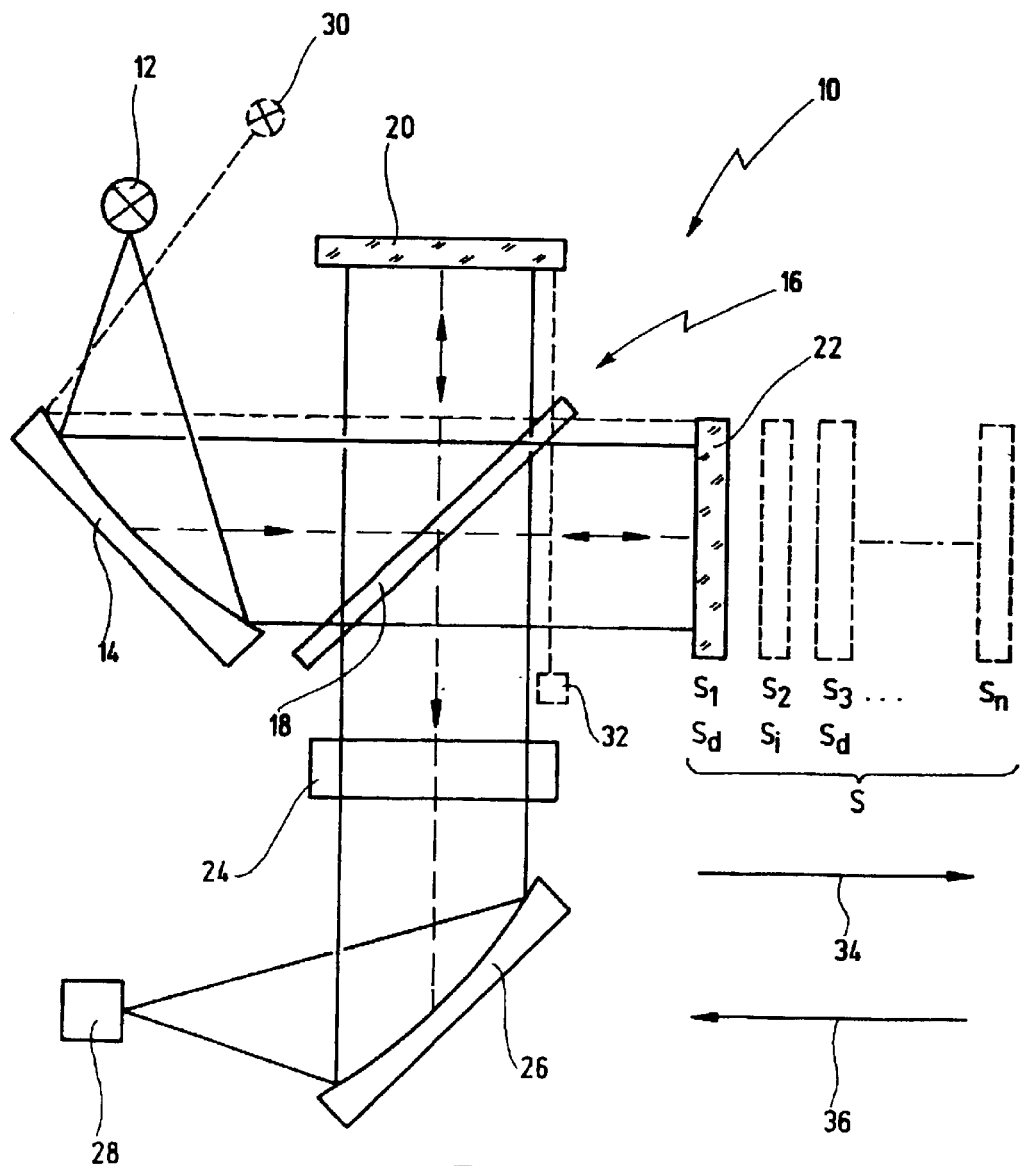
FIG. 1 schematically shows the principle set-up of a FT-spectrometer.

FIG. 1 shows the principle set-up of a Fourier-transform (FT)-spectrometer generally labeled with reference numeral 10, by means of which a spatially resolved spectrum of a sample can be taken.

The FT-spectrometer 10 comprises a light source 12 for emitting measuring light. According to the employment of the FT-spectrometer 10 for taking an infrared (IR)-spectrum, the light source 12 is a light source emitting in the infrared spectral range.

A collimator mirror 14 is disposed downstream of the light source 12, and an interferometer 16 is disposed downstream of the collimeter mirror 14.

The interferometer 16 comprises a beam splitter 18, for example a plane-parallel semi-reflecting plate of glass. The interferometer 16 further comprises a fixed reflector 20, for example a plane mirror, and a movable reflector 22, which can also be configured as a plane mirror.

A sample 24 from which the IR-spectrum is to be taken is disposed in the beam path of the light emitted by the light source 12 and coming from the interferometer 16. Another collimeter mirror 26 is disposed downstream of the sample 24, and, finally, an array-detector 28 for measuring in spatially resolved manner is disposed downstream of the collimeter mirror 26. Accordingly, the array-detector 28 comprises a plurality of pixels or voxels disposed in an array, which receive measuring signals coming from single area or volume points of the sample 24. The array-detector 28 is, for example, a focal-plane-array-detector.

The light emitted by the light source 12 is first directed to the beam splitter 18 as a parallel light bundle by means of the collimeter mirror 14. A beam splitting occurs at the beam splitter 18, wherein a first beam part is directed onto the fixed reflector 20, while a second beam part passes through the beam splitter 18 and is directed onto the movable reflector 22. The beam parts scattered back by the fixed reflector 20 and the movable reflector 22 are then brought into interference at the beam splitter 18. The two beam parts brought into interference are then directed in common onto the sample 24, wherein the measuring of the spectrum takes place in transmission in the present case. Depending on the absorption properties of the sample 24, all or a part of the interference light is transmitted by the sample 24 and is subsequently focussed to the array-detector 28 by the collimeter mirror 26. Thus, the array-detector 28 detects the intensity of the interference light transmitted through the sample 24 in a spatially resolved manner.

The movable reflector 22 is continuously displaced at a constant rate along a distance s in order to pick-up the spectrum. Accordingly, an interferogram, which is picked up by the array-detector 28, is created as a function of the optical path length difference between the beam part reflected by the fixed reflector 20 and the beam path reflected by the movable reflector 22.

The array-detector 28 hence detects the intensity transmitted through the sample 24 as a function of the space coordinate of the movable reflector 22, wherein this space dependent distribution of the intensity is subsequently converted into a wave number dependent intensity distribution, i.e. in the spectrum to be taken, by conducting a mathematical Fourier transformation in a computer unit (not shown).

The space-dependent detection of the intensity distribution, however, does not occur at arbitrary continuous position coordinates of the movable reflector 22, but at discrete position coordinates or way points $s_1, s_2, \ldots, s_n$ of the movable reflector 22 only.

Another monochromatic light source 30, for example a helium-neon-laser having a monofrequency emission, is used in order to predetermine or to gage the discrete way points $s_1, s_2, \ldots s_n$. The light emitted by the light source 30 is also coupled into the interferometer 16 and detected by another detector 32. Upon displacement of the movable reflector 22, the detector 32 detects an intensity distribution or an interferogram which is sinusoidal due to the single mode property of the light emitted by the light source 30. The zero passages of this sign signal or a multiple thereof then serve to determine the discrete way points $s_1, s_2, \ldots, s_n$, at which the pixels or voxels of the array-detector 28 are completely read out, respectively.

The number n of predetermined discrete way points $s_1, s_2, \ldots s_n$ usually is large and is predetermined by the length of the distance s, over which the movable reflector 22 is displaceable, wherein the spectral resolution of the spectrum to be taken is improved with increasing distance s, and, on the other hand, by the interval between the way points $s_1, s_2, \ldots, s_n$, wherein the interval between two adjacent way points determines the maximum wave number range of the spectrum, such that the smaller the interval between respective adjacent ones of the way points $s_1, s_2, \ldots, s_n$ the larger is the wave number range.

In order to take a spectrum, the movable reflector 22, for example starting at the reflector position or the way point $s_1$, is displaced in direction of an arrow 34.

However, the array-detector 28 is not read out at immediately successive way points $s_1, s_2, \ldots, s_n$ in a sequential manner, but the array-detector 28 is read out at respectively not adjacent way points $s_d$ of the movable reflector 22 which are separated by at least one respective intermediate way point $s_i$. Accordingly, the movable reflector 22 is displaced over the distance s at least twice, and the array-detector 28 is read out at the way point $s_i$ upon the second or, if necessary, repeated displacement of the movable reflector 22 along the distance s.

For that purpose, the FT-spectrometer 10 comprises a respective control for displacing the reflector 22 and for reading out the array-detector 28.

It is to be understood that it is not absolutely necessary within the scope of the present invention to always leave out the same number of intermediate way points $s_i$ at which the array-detector 28 is not read out when the movable reflector 22 is displaced over the distance s.

However, it is preferred if the same number of intermediate way points $s_i$ between two respective way points $s_d$ are leaved out at which the array-detector 28 is not read out, when the movable reflector 22 is displaced.

In this preferred embodiment, the array-detector 28 is read out at way points $s_1, s_{1+m}, s_{1+2m}, \ldots, s_{n-m+1}$ during the first displacement of the movable reflector 22 along the distance s, at way points $s_2, s_{2+m}, s_{2+2m}, \ldots, s_{n-m+2}$ during the at least second displacement along the distance s and at way points $s_m, s_{2m}, \ldots, s_n$ during the $m^{th}$ displacement along the distance s, wherein 1<m<n and n:m is an integer.

Figure 2:
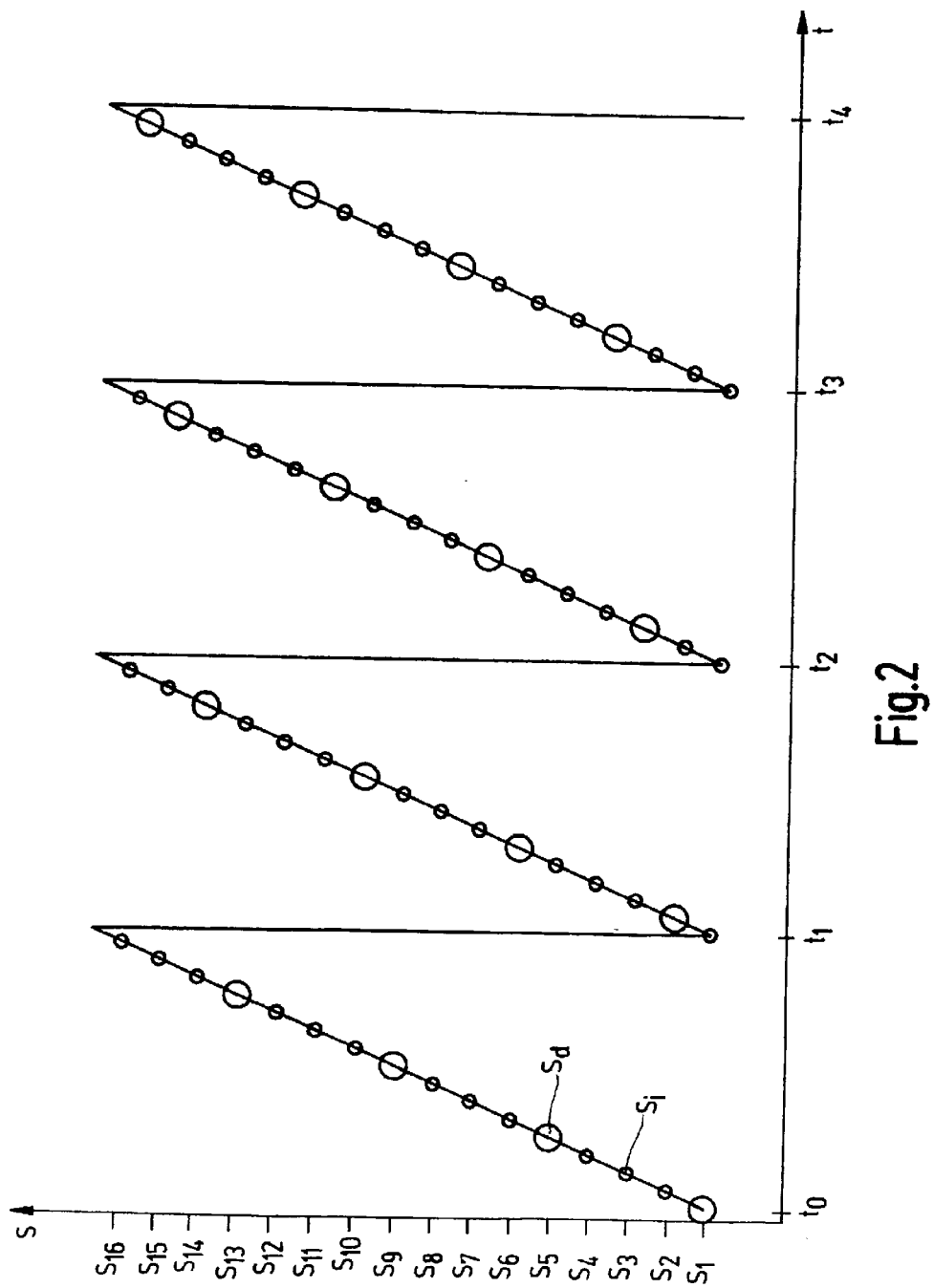
FIG. 2 shows a path-time-diagram of a scanning scheme for picking up data at n=16 way points in total.

FIG. 2 shows a scanning scheme for n=16 and m=4. FIG. 2 is a path-time-diagram for the movable reflector 22, wherein the time t is plotted on the abscissa and the distance s is plotted on the ordinate. The predetermined discrete way points are labeled with $s_1$ to $s_{16}$ and illustrated by small and large circles in the diagram. The array-detector 28 is not read out at the way points $s_i$ illustrated by small circles, while the array-detector 28 is read out at the way point $s_d$ plotted by large circles.

Starting at the time $t_0$, the movable reflector is displaced from its position or way point $s_1$, wherein the measuring signal present at the way point $s_1$ is read out from the array-detector 28 and stored. The movable reflector 22 is continuously displaced at a constant rate in the direction of the arrow 34 in FIG. 1. There is no read-out of the array-detector 28 at the way points $s_2$, $s_3$ and $s_4$, but the next read-out takes place when the movable reflector 22 has reached the way point $s_5$. The time t which the movable reflector 22 needs for its displacement between the way points $s_1$ and $s_5$, is now available to the array-detector 28 for the data transfer.

Thus, the movable reflector 22 is read out at the way point $s_1$, $s_5$, $s_9$ and $s_{13}$ during the first displacement of the movable reflector 22 along the distance s.

After having reached the way point $s_{16}$, at which the array-detector 28 has not been read out during the first displacement of the movable reflector 22, the movable reflector 22 is returned in direction of an arrow 36 in FIG. 1 into the starting position corresponding to the way point $s_1$, wherein the return of the movable reflector 22 takes place at a higher rate than the displacement of the movable reflector 22 for reading out the array-detector 28, as can be taken from the path-time representation in FIG. 2. The array-detector 28 is now read out at the way points $s_2$, $s_6$, $s_{10}$ and $s_{14}$ of the movable reflector 22 during the second displacement of the movable reflector 22 along the distance s, etc. As the array-detector 28 is read out at each fourth way point $s_d$ only (m=4) in the scanning scheme represented in FIG. 2, the movable reflector 22 has to be displaced along the distance s for reading out the array-detector 28 four times, accordingly.

Instead of returning the movable reflector 22 after reaching the way point $s_{16}$ each time in the starting position according to the way point $s_1$ and reading out the array-detector 28 in one displacement direction (arrow 34) of the movable reflector 22 only, it can also be envisaged to read out the array-detector 28 in both displacement directions of the movable reflector 22, wherein, however, it is then necessary to move the movable reflector 22 in both displacement directions at an equal or comparable displacement rate.

On account of the method according to the invention, the movable reflector 22 can be moved at a rate in the range of about 4 to 6 cm/s, preferably about 5 cm/s suitable for a non-sensitive or only unimportantly sensitive motion, even if the used array-detector 28 has a data rate which would not allow for such a high displacement rate in a sequential successive approaching of the single way points $s_1, \ldots, s_n$, because sufficient time is available to the array-detector 28 for the data transfer which is achieved by leaving out the intermediate way points $s_i$. For that, the number m is chosen in dependence on the data rate of the array-detector 28, namely just as large that so many way points $s_i$ are leaved out between two way points $s_d$ and $s_{d+m}$ that the read-out of the complete data set of the way point $s_d$ out of the array-detector 28 is completed when the reflector 22 has reached the way point $s_{d+m}$.

What is claimed is:

1. A method for taking a spatially resolved spectrum of a sample by means of a Fourier-transform (FT)-spectrometer, comprising the steps of:

feeding light emitted by a light source to an interferometer, said interferometer comprising a movable reflector, and displacing said movable reflector along a distance s;

directing said light coming from said interferometer onto said sample;

detecting said light coming from said sample by an array-detector; and reading out said array-detector at a number n of predetermined discrete way points $s_1, \ldots, s_n$ of said distance s, respectively, wherein said array-detector is first read out at respective non-adjacent way points $s_d$ of said discrete way points $s_1, \ldots, s_n$ which are separated by at least one respective intermediate way point $s_i$, and wherein said movable reflector is displaced over said distance s at least twice, wherein said array-detector is read out at said intermediate way points $s_i$ during a second or further repeated displacement of said reflector along said distance s.

2. The method of claim 1, wherein said array-detector is read out at way points $s_1$, $s_{1+m}$, $s_{1+2m}$, $\ldots s_{n-m+1}$ during a first displacement of said reflector along said distance s, at way points $s_2$, $s_{2+m}$, $s_{2+2m}$, $\ldots, s_{n-m+2}$ during at least a second displacement of said reflector along said distance s, and at way points $s_m$, $s_{2m}, \ldots, s_n$ during a $m^{th}$ displacement of said reflector along said distances, wherein 1<m<n and n:m is an integer.

3. The method of claim 2, wherein m is chosen in dependence on a data rate of said array-detector.

4. The method of claim 1, wherein said array-detector is read out in two directions of displacement of said movable reflector.

5. The method of claim 1, wherein said array-detector is read out in one of two directions of displacement of said movable reflector only, wherein said reflector is returned in an initial position after each displacement along said distance s.

6. The method of claim 5, wherein said reflector is returned at a rate which is higher than the rate when displaced for reading out said array-detector.

7. The method of claim 1, wherein said reflector is continuously displaced at a constant rate when displaced for reading out said array-detector.

8. The method of claim 1, wherein said reflector is displaced at a rate in the range of about 4 to 6 cm/s.

9. A Fourier-Transform (FT)-spectrometer for taking a spatially resolved spectrum of a sample, comprising:

a light source;

an interferometer having a movable reflector which is displaceable along a distance s;

an array-detector; and a control operatively connected with said array-detector in order to read out said array-detector at a number n of predetermined discrete way points $s_1, \ldots, s_n$ of said distance s, respectively, said control being configured such that, when said movable reflector is displaced along said distance s, said array-detector is first read out at respective non-adjacent way points $s_d$ separated by at least one respective intermediate way point $s_i$, and said movable reflector is displaced along said distance s at least twice, wherein said array-detector is read out at said way points $s_i$ during a second or further repeated displacement along said distance s.

* * * * *